United States Patent
Clevenger

(10) Patent No.: US 6,199,917 B1
(45) Date of Patent: Mar. 13, 2001

(54) TWIST PIN

(75) Inventor: James H. Clevenger, De Graff, OH (US)

(73) Assignee: Holdren Brothers, Inc., West Liberty, OH (US)

( * ) Notice: Subject to any disclaimer, the term of this patent is extended or adjusted under 35 U.S.C. 154(b) by 0 days.

(21) Appl. No.: 09/281,659

(22) Filed: Mar. 30, 1999

(51) Int. Cl.⁷ .................................................. F16L 37/00
(52) U.S. Cl. ........................ 285/305; 411/530; 411/514; 24/201 LP; 239/600
(58) Field of Search ............................. 285/305; 411/530, 411/513, 514; 24/201 LP; 403/378, 408.1, 326, 324, 328, 353, 155; 239/600

(56) References Cited

U.S. PATENT DOCUMENTS

| | | | |
|---|---|---|---|
| 1,625,303 | * 4/1927 | Fenton | 411/513 |
| 1,799,934 | * 4/1931 | Strid | 411/514 |
| 1,981,938 | 11/1934 | Anderson | 304/40 |
| 2,287,634 | 6/1942 | Niven | 85/8.5 |
| 2,589,482 | 3/1952 | Downey | 287/52.08 |
| 2,865,662 | 12/1958 | Nurmse | 287/53 |
| 3,263,552 | 8/1966 | Fischer | 85/8.3 |
| 3,390,897 | 7/1968 | Moore | 285/33 |
| 3,625,551 | 12/1971 | Branton et al. | 285/305 |
| 3,876,321 | 4/1975 | Haines | 403/396 |
| 4,019,593 | 4/1977 | Craig | 175/340 |
| 4,298,299 | 11/1981 | Quarles | 411/514 |
| 4,488,831 | * 12/1984 | Waite | 403/209 |
| 4,583,430 | 4/1986 | Farley | 81/177.85 |
| 4,699,553 | 10/1987 | Lesikar | 411/353 |
| 5,217,338 | 6/1993 | Czubek | 411/343 |
| 5,324,152 | * 6/1994 | Anderson, IV | 411/530 |
| 5,599,150 | * 2/1997 | Edwards et al. | 411/530 |

FOREIGN PATENT DOCUMENTS

| | | |
|---|---|---|
| 1224565 | 9/1966 | (DE) . |
| 1369526 | 7/1964 | (FR) . |
| 0123461 | 2/1919 | (GB) . |

* cited by examiner

Primary Examiner—Eric K. Nicholson
(74) Attorney, Agent, or Firm—Biebel & French

(57) ABSTRACT

A twist pin for securing an outer cylindrical sleeve to an inner member concentrically received within the sleeve. The twist pin includes a first leg terminating at a first end and defining a longitudinal leg axis. A second leg extends downwardly from the first leg and extends more than 180 degrees around the outer circumference of the sleeve. The second leg passes below the leg axis proximate the first end at a crossover and terminates at a second end. A locking portion includes a protuberance extending inwardly toward the sleeve. The protuberance includes a bearing surface for contacting the sleeve and which is positioned below the first leg intermediate the crossover and the second end.

14 Claims, 6 Drawing Sheets

TWIST PIN

BACKGROUND OF THE INVENTION

1. Field of the Invention

The present invention relates to locking pins and, more particularly, to a twist pin for use in combination with a fluid coupling.

2. Description of the Prior Art

Various forms of locking pins have been developed for providing locking engagement between two or more parts. These fasteners include roll pins, cotter keys, head pin fasteners, hairpin fasteners, clinch pins, hitch pins and similar clips.

One particular application of typical prior art fasteners is in combination with fluid couplings 2 wherein an inner tubular member 3 is received within an outer sleeve 4 as illustrated in FIG. 1. The inner tubular member 3 and outer sleeve 4 have coaxially aligned apertures 5a and 5b for receiving a fastener 6 which secures the relative positioning of the inner tubular member 3 and outer sleeve 4. A typical fastener 6 used for such an application is a U-shaped retaining clip having a straight portion 7 and a crimped portion 8. The straight portion 7 passes through the coaxially aligned apertures 5a and 5b while the crimped portion 8 engages the outside surface of the outer sleeve 4 thereby locking the pin 6 in place.

A problem associated with traditional retaining clips 6 is that they are often difficult to install within and remove from the fluid coupling 2. As may be appreciated, upon installation and removal the crimp portion 8 must be forced outwardly by the outer sleeve 4 such that a bend may selectively lock and unlock the outer sleeve 4 and inner tubular member 3 in position. The installation and removal of conventional retaining clips 6 therefore often requires the use of special tools.

One common fluid coupling application utilizing fasteners provides for a spray head 9 of the type used in the cleaning industry supported by the outer sleeve 4. More particularly, the spray head 9 and fluid coupling 2 are passed through a ferrule for insertion into a processing vessel. Once positioned within the vessel, the spray head 9 is utilized to clean the interior thereof.

Standard prior art retaining clips 6 have a straight portion 7 which is often too long to pass through the inner diameter of the ferrule. As such, the straight portion 7 of the retaining clips 6 are often shortened such that the straight portion 7 does not extend much beyond the outer sleeve 4. While this permits the fluid coupling 2 to pass through the ferrule, a new problem results as the shortened retaining clip 6 is often difficult to properly position in locking engagement with the outer sleeve 4. More particularly, the crimped portion 8 of the shortened retaining clip 6 often inhibits coaxial alignment of the straight portion 7 within the apertures 5a and 5b in the outer sleeve 4 and inner tubular member 3. As such, assembly of the fluid coupling 2 is often a very difficult process.

Accordingly, there is a need for a locking pin which may be simply inserted and removed between cooperating parts for selectively providing a positive lock between such parts. Further, there is a need for such a pin having a compact shape thereby requiring a minimum amount of space.

SUMMARY THE INVENTION

The present invention relates to a twist pin for securing an outer sleeve to an inner member concentrically received within the sleeve. The outer sleeve includes a first cylindrical wall having an outer diameter and defining a sleeve center axis. A first pair of diametrically opposed and coaxially aligned apertures are formed within the first cylindrical wall. The inner member includes a second cylindrical wall and a second pair of apertures formed within the second cylindrical wall wherein the first and second pairs of apertures are coaxially aligned.

The twist pin for securing the outer sleeve to the inner member includes a first leg extending through the coaxially aligned first and second pairs of apertures. The first leg terminates at a first end positioned outside of the first cylindrical wall and defines a longitudinal leg axis. A sleeve plane is defined by the sleeve axis and the leg axis and essentially divides the sleeve into two equal longitudinally extending portions.

A second leg extends downwardly from the first leg and extends around the first cylindrical wall for more than 180 degrees to terminate at a second end. The second leg passes below the longitudinal axis proximate the first end of the first leg at a crossover. A clearance is defined between the second leg and the first cylindrical wall wherein the first leg is selectively rotatable about the longitudinal axis.

A passage is defined between the second leg and the longitudinal axis at the crossover. The passage has a width measured in a perpendicular direction from the longitudinal axis to the second leg, the width being at least as great as one half of the outer diameter of the sleeve for allowing the pin to slide past the sleeve when the twist pin is not in a locked position, thereby facilitating insertion and removal of the first leg within the first and second pairs of apertures.

The second leg includes an arcuate return portion having a radius greater than one half of the outer diameter of the sleeve thereby defining the clearance between the second leg and the first cylindrical wall. The second leg further includes a straight connecting portion disposed intermediate the first leg and the return portion. The connecting portion extends in substantial perpendicular relation to the longitudinal leg axis.

A locking portion is connected to the return portion of the second leg and includes a protuberance defining a bearing surface. The bearing surface is positioned below the first plane and intermediate the crossover and the second end of the second leg. The locking portion includes a first locking member and a second locking member angled relative to the first locking member to form a bend therebetween. The bend defines the protuberance and extends inwardly toward the sleeve center axis. The bearing surface is selectively engagable with the first cylindrical wall upon selective rotation of the first leg about the longitudinal axis.

When the first leg is received within the first and second pairs of apertures, the twist pin has unlocked and locked modes of operation. In the unlocked mode of operation, the first leg is freely slidable within the first and second pairs of apertures and the bearing surface of the locking portion is positioned on the same side of the sleeve plane as the return portion. As such, the bearing surface is not lockingly engaging the first cylindrical wall of the outer sleeve.

In the locked mode of operation, the second leg is pivoted about the longitudinal axis of the first leg such that the protuberance of the locking portion is disposed on an opposite side of the sleeve plane from the return portion. The bearing surface engages the outer surface of the first cylindrical wall beyond the sleeve plane, thereby preventing rotation of the first leg and subsequent pivoting movement of the second leg. The first leg of the pin is thereby secured within the first and second pairs of apertures.

Therefore, it is an object of the invention to provide a locking pin simple in design and use for mechanically locking at least two parts.

It is a further object of the invention to provide such a pin which is of compact design.

It is another object of the invention to provide such a pin which may be easily installed without the use of special tools.

It is yet another object of the invention to provide a pin which is self-fitting and self-locking.

It is a further object of the invention to provide such a pin which prevents inadvertent removal and unlocking.

It is yet another object of the invention to provide a twist pin which cannot be released without imparting a twisting motion.

Other objects and advantages of the invention will be apparent from the following description, the accompanying drawings and the appended claims.

DETAILED DESCRIPTION OF THE PREFERRED EMBODIMENT

Figure 1:
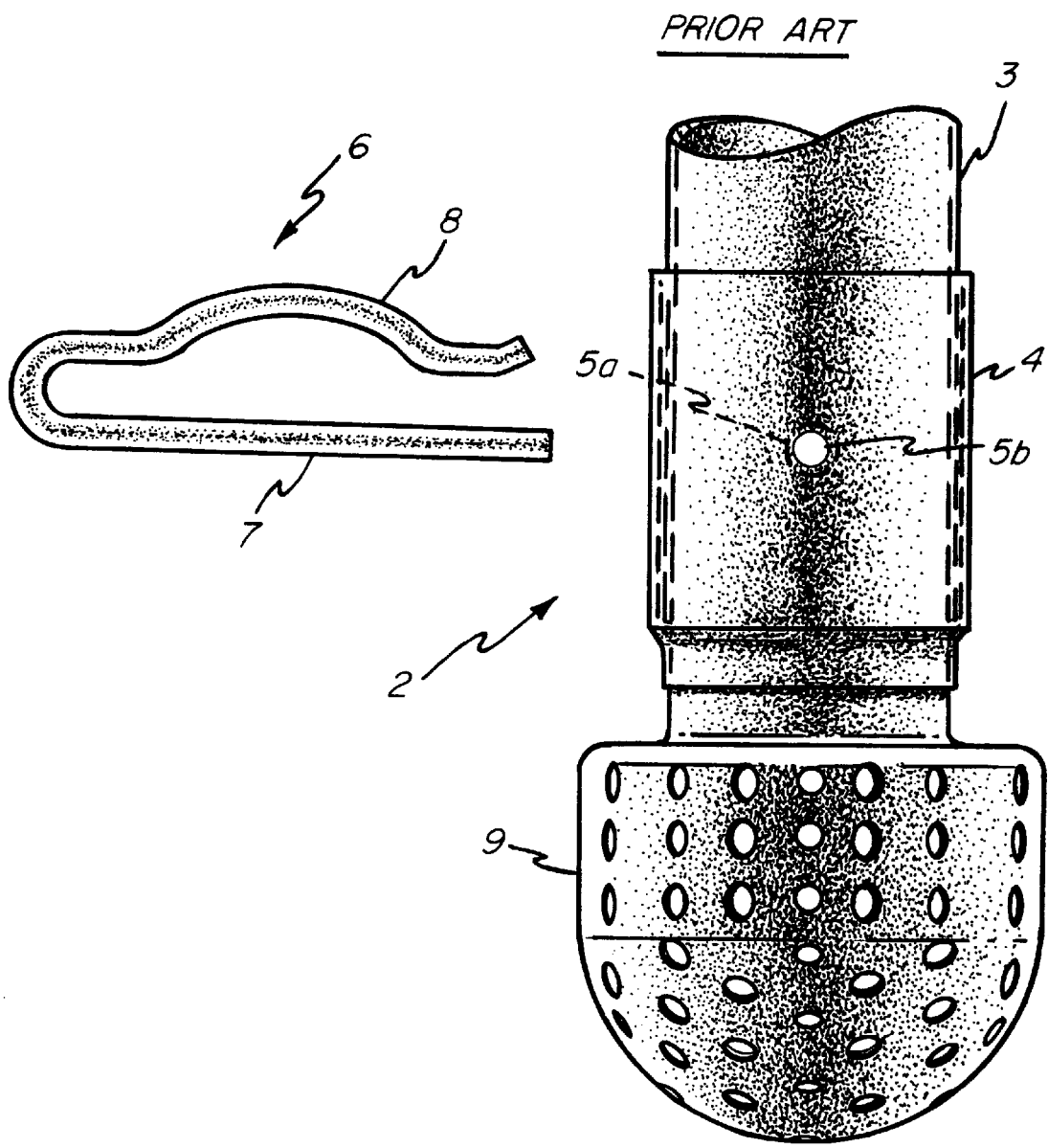
FIG. 1 is a side elevational view of a prior art retaining clip removed from a fluid coupling.
Figure 2:
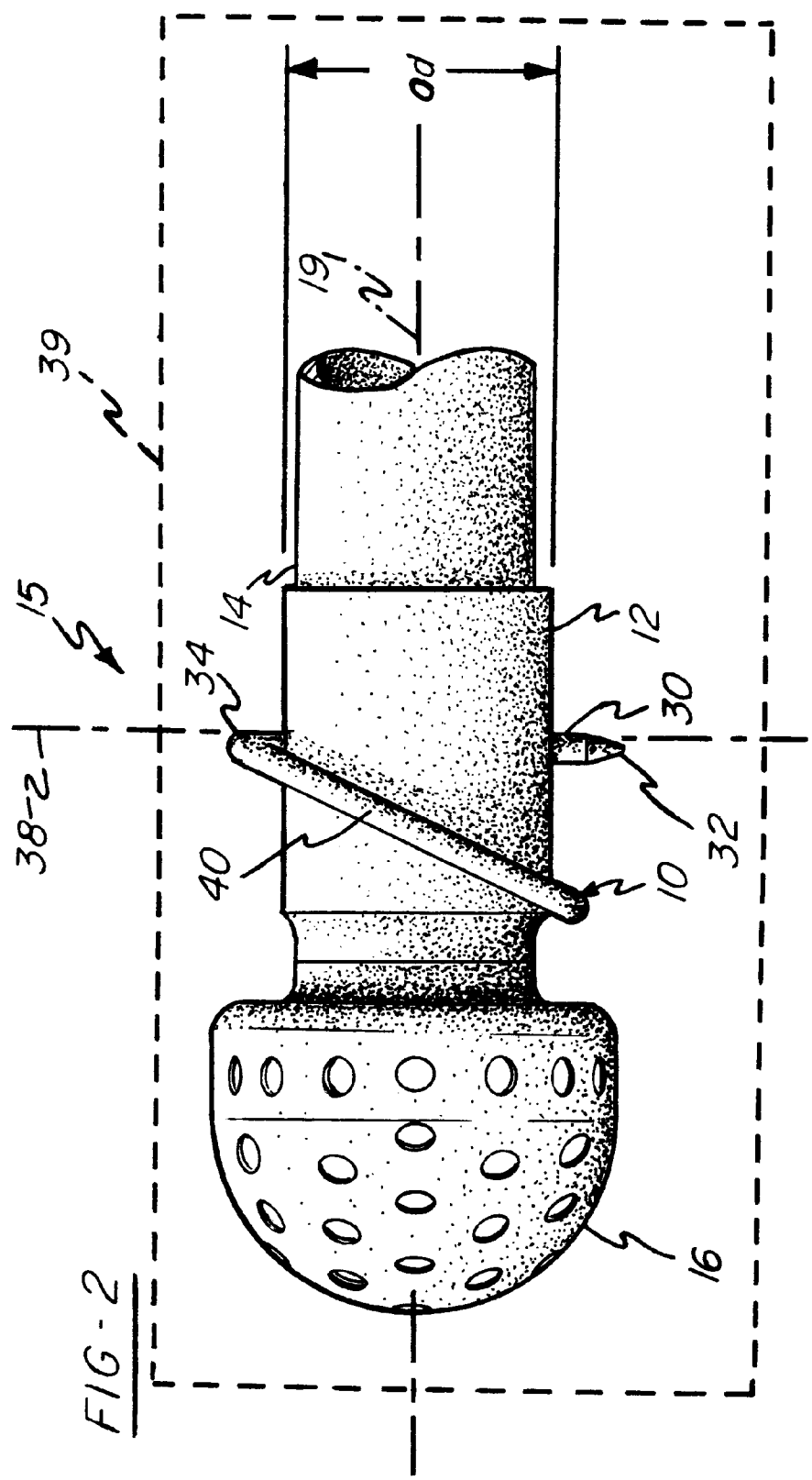
FIG. 2 is a side elevational view of the twist pin of the present invention installed within a fluid coupling.

Referring initially to FIG. 2, the twist pin 10 of the present invention is shown in locking engagement with an outer sleeve 12 and an inner tubular member 14 to form a fluid coupling 15. The outer sleeve 12 supports a spray head 16 of the type well known in the art. The spray head 16 preferably comprises Model No. SB 18 which is available from Holdren Brothers, Inc. of West Liberty, Ohio. However, it may be appreciated that similar spray heads may be readily substituted therefore.

It should be further noted that while the following description of the invention contemplates use of the twist pin 10 in a fluid coupling 15, this in no way limits the scope of the invention. The twist pin 10 may be utilized to connect similar components for a variety of different purposes.

Figure 3:
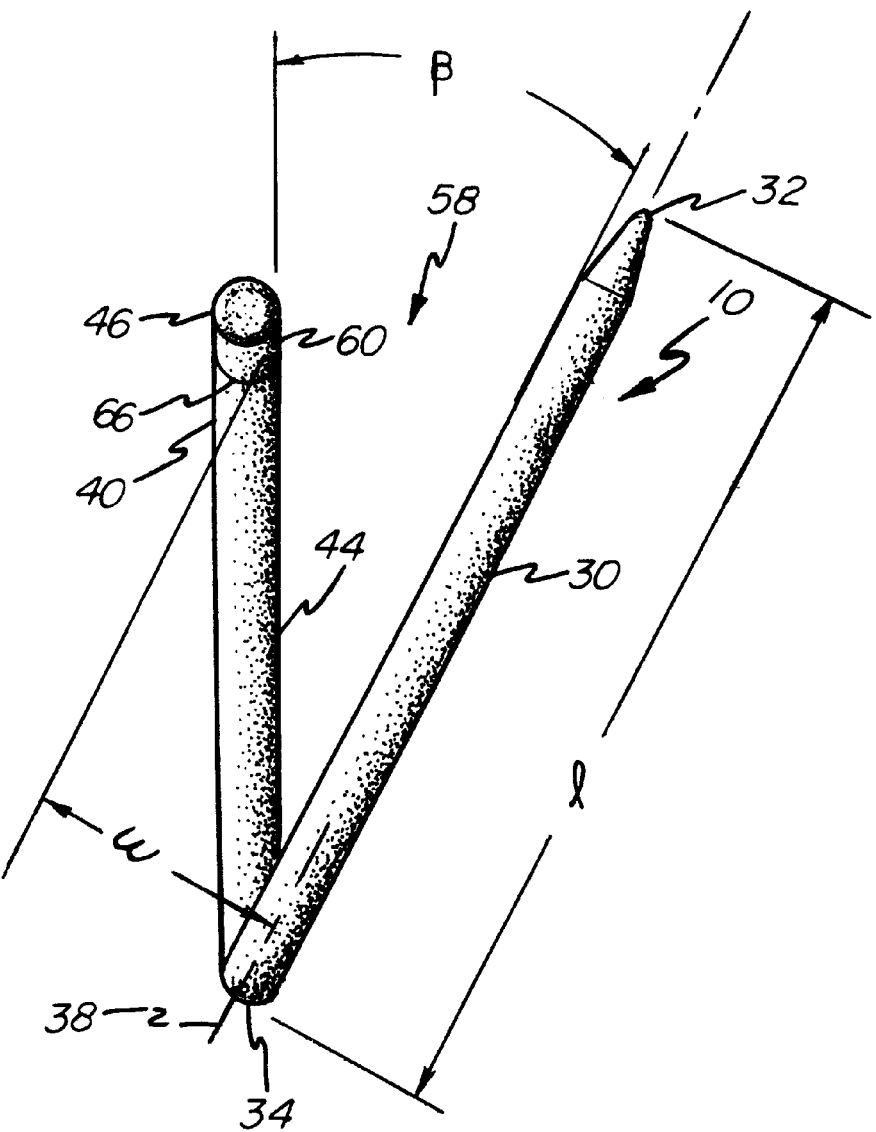
FIG. 3 is a side elevational view of the twist pin of the present invention.
Figure 4:
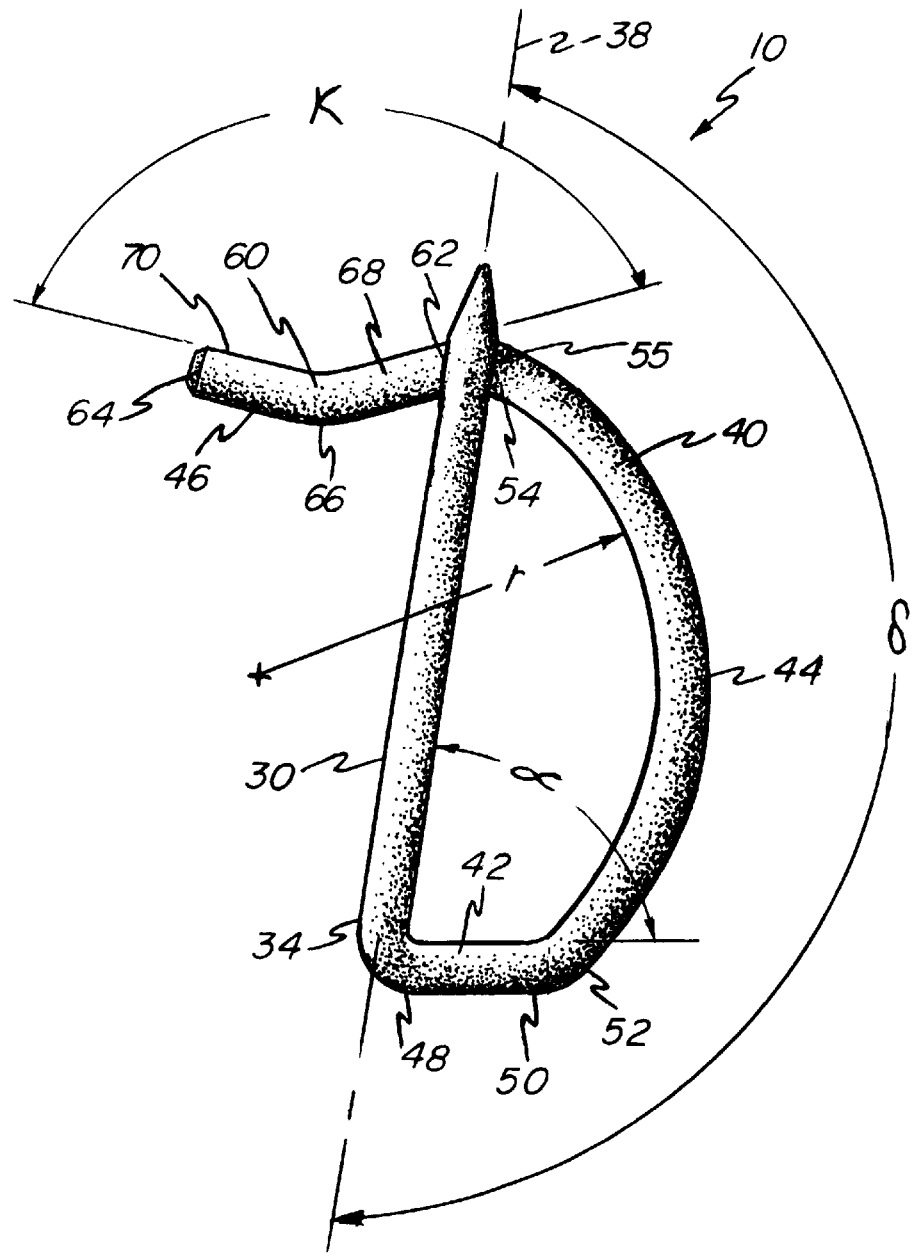
FIG. 4 is a top plan view of the twist pin of FIG. 3.
Figure 5:
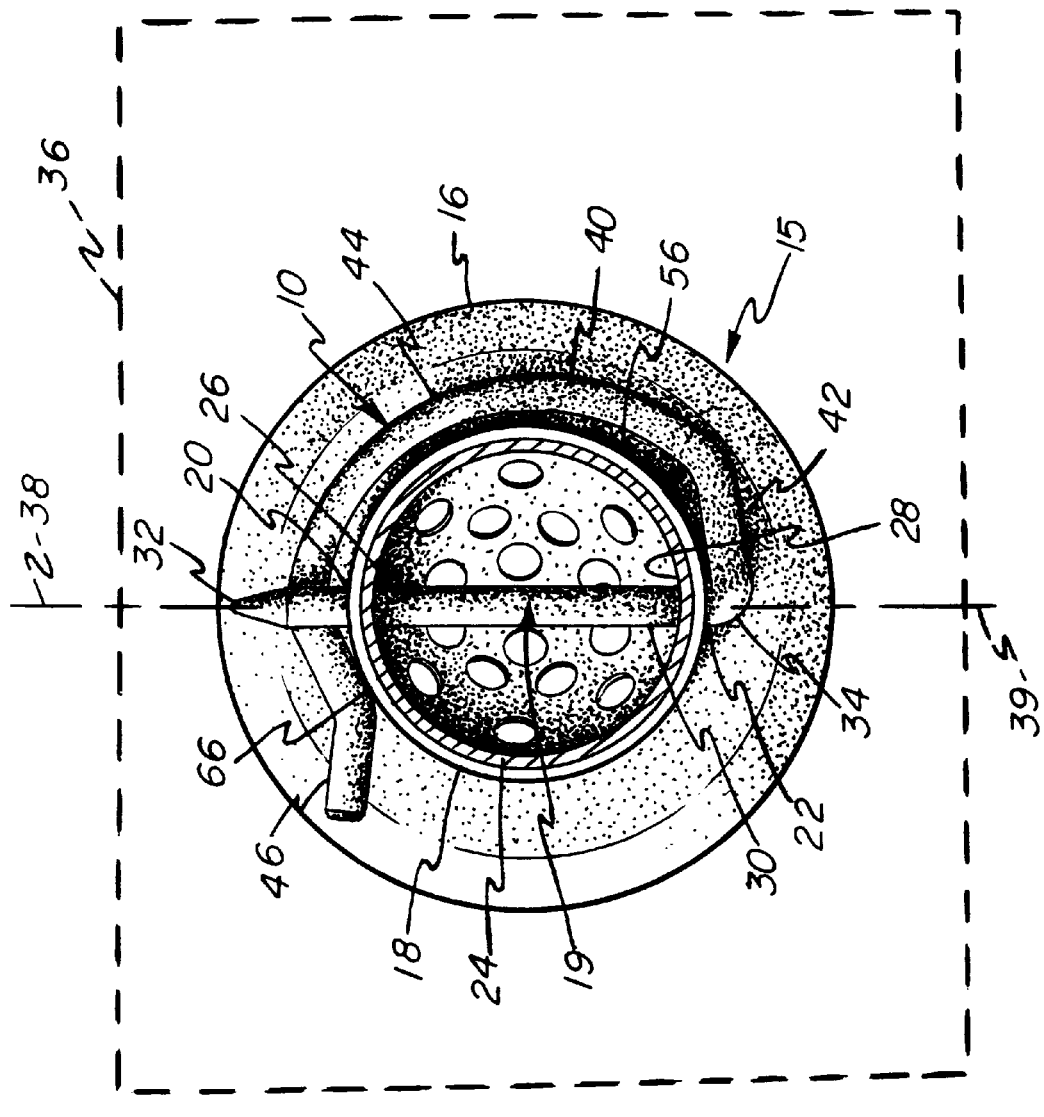
FIG. 5 is an end view of the twist pin of the present invention installed within the fluid coupling FIG. 2, illustrating the twist pin in a locked position.

Referring now to FIGS. 2–5, the outer sleeve 12 includes a first cylindrical wall 18 which is concentrically disposed about a sleeve axis 19. The cylindrical wall 18 defines an outer diameter "od" (FIG. 2). A first pair of coaxially aligned and diametrically opposed apertures 20 and 22 are formed within the cylindrical wall 18 (FIG. 5).

The inner tubular member 14 includes a second cylindrical wall 24 concentrically received within the first cylindrical wall 18 of the outer sleeve 12. A second pair of apertures 26 and 28 are formed within the second cylindrical wall 24 and are diametrically opposed to each other. The first and second pair of apertures 20, 22 and 26, 28 are coaxially aligned.

The twist pin 10 of the present invention provides a positive mechanical lock between the outer sleeve 12 and the inner tubular member 14. While the twist pin 10 may be manufactured from any suitable material depending upon its intended use, it is preferred that for a fluid coupling application, the twist pin 10 comprise stainless steel for durability and corrosion resistance. Regardless of the material utilized in the manufacture of the twist pin 10, from the following description it should be apparent that the pin 10 does not lose any of its physical properties during normal use since locking engagement provided by the pin 10 does not depend upon any biased force being applied thereby.

Referring further to FIGS. 3 and 4, the twist pin 10 of the present invention includes a straight first leg 30 extending between first and second ends 32 and 34. The first leg 30 is disposed within a first plane 36 and defines a longitudinal leg axis 38 which necessarily lies within the first plane 36 (FIG. 5). A sleeve plane 39 is defined by the sleeve axis 19 and the leg axis 38 and essentially divides the sleeve 12 into first and second equal longitudinally extending portions (FIGS. 2–5). The first end 32 of the first leg 30 is preferably tapered in order to facilitate insertion within the apertures 20,22 and 26,28 of the first and second cylindrical walls 18 and 24.

The first leg 30 extends between the first and second pairs of coaxially aligned apertures 20,22 and 26,28 wherein the first end 32 extends outside of the first cylindrical wall 18 adjacent aperture 20. Likewise, the second end 34 of the first leg 30 extends outside of the first cylindrical wall 18 adjacent aperture 22. The first leg 30 is selectively rotatable about the longitudinal leg axis 38 when it is received within the outer sleeve 12 and inner tubular member 14.

A second leg 40 is integrally formed with the first leg 30 and includes a connecting portion 42, an arcuate return portion 44 and a locking portion 46. The connecting portion 42 is disposed substantially perpendicular, and preferably at an angle α of 80°, to the first leg 30 and extends between first and second ends 48 and 50. The first end 48 of the connecting portion 42 is connected to the second end 34 of the first leg 30 at a first bend.

Figure 6:
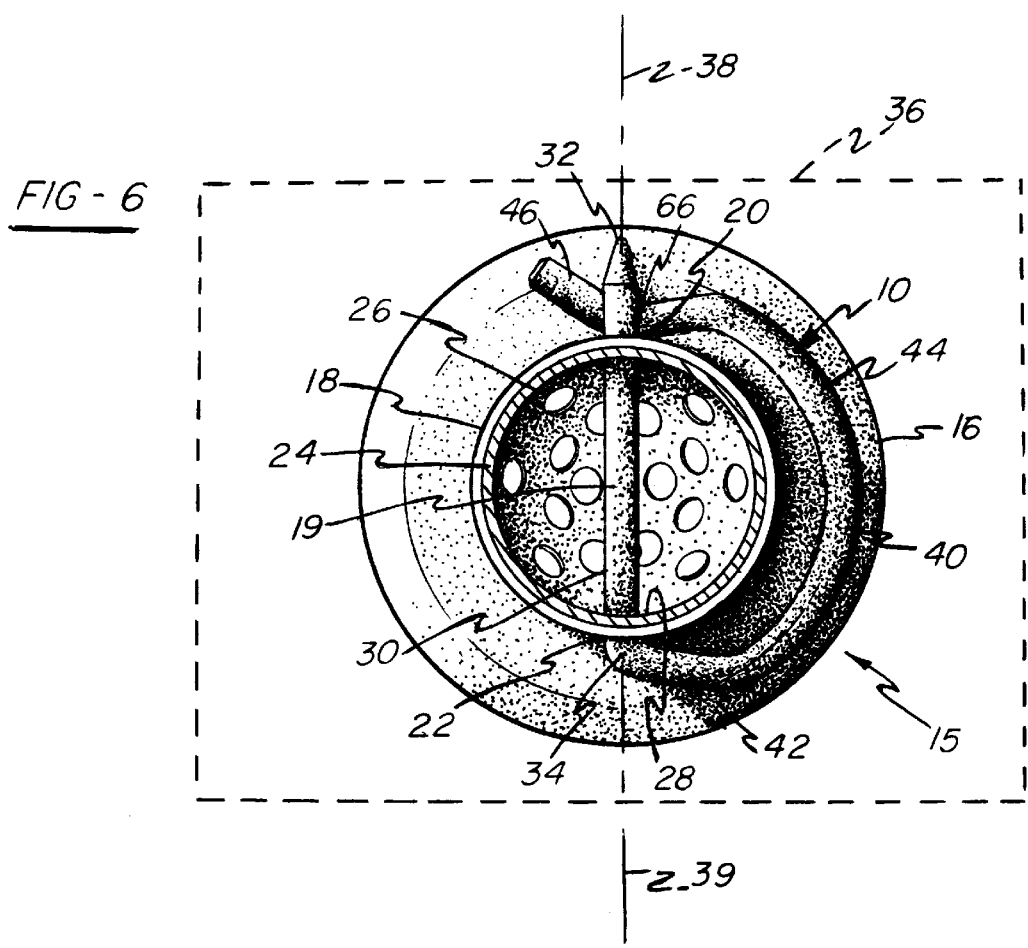
FIG. 6 is an end view of the twist pin of FIG. 5, illustrating the twist pin in an unlocked position.

The arcuate return portion 44 of the second leg 40 extends between first and second ends 52 and 54. The first end 52 of the return portion 44 is connected to the second end 50 of the connecting portion 42. The return portion 44 passes below the leg axis 38 proximate the first end 32 of the first leg 30 at a crossover point 55. The return portion 44 descends at an angle B, which is preferably approximately equal to 28 degrees. As illustrated in FIG. 5, a clearance 56 is provided between the return portion 44 and the first cylindrical wall 18. The clearance 56 permits for the selective rotation of the first leg 30 around the longitudinal leg axis 38 between a locked position as illustrated in FIG. 5 and an unlocked position as illustrated in FIG. 6. The clearance 56 is preferably provided by defining the radius of curvature "r" of the actuate portion 44 to be greater than one half of the outer diameter "od" of the first cylindrical wall 18 (FIGS. 2 and 4). In the preferred embodiment of the present invention, the radius of curvature "r" of the arcuate return portion 44 is defined as being substantially equivalent to 0.8 times the outer diameter "od" of the first cylindrical wall 18.

The connecting portion 42 and the return portion 44 combine to extend an angle δ relative to the longitudinal axis 38. The angle δ preferably equals approximately 180 degrees around the cylindrical wall 18 from the first end 48 of the connecting portion 42 to the crossover point 55 positioned below the longitudinal axis 38. As such, the locking portion 46 is supported more than 180 degrees around the outer circumference of the sleeve 12 from the second end 34 of the first leg 30.

Referring further to FIG. 3, a passage 58 is defined between the longitudinal axis 38 of the first leg 30 and the crossover point 55 of the second leg 40. The passage 58 has a width "w" measured perpendicularly from the longitudinal leg axis 38 to the crossover point 57. The width "w" of the passage 58 is at least as great as one half of the outer diameter "od" of the sleeve 12. This is necessary so that the sleeve 12 may pass through the passage 58 when the twist pin 10 is in the unlocked position of FIG. 6. The width "w" of the passage 58 is preferably equal to 0.6 times the outer diameter "od" of the sleeve 12.

The locking portion 46 includes a protuberance 60 positioned intermediate first and second end 62 and 64. The first end 62 of the locking portion 46 is connected to the second end 54 of the arcuate return portion 44. The protuberance 60 includes a bearing surface 66 for selectively engaging the cylindrical wall 18 of the outer sleeve 12. The protuberance 60 extends radially inwardly toward the center axis 19 of the sleeve 12 and is defined by a bend between first and second locking members 68 and 70. The bend preferably defines an angle κ approximately equal to 150 degrees between locking members 68 and 70.

Turning now to FIGS. 5 and 6, the operation of the twist pin 10 of the present invention will be described in greater detail. Initially, a user inserts the inner tubular member 14 within the outer sleeve 12 supporting the spray head 16 such that the first and second pairs of apertures 20,22 and 26,28 are coaxially aligned. The passage 58 permits the second leg 40 to slide past the sleeve 12 during insertion and removal of the first leg 30 within the apertures 20,22 and 26,28. The first leg 30 of the twist pin 10 is positioned within the first and second pairs of apertures 20,22 and 26,28 by guiding the first end 32 therethrough until the second end 34 is positioned adjacent aperture 22. The fluid coupling 15 in this first, or unlocked, mode of operation is illustrated in FIG. 6. As clearly shown the bearing surface 66 of the locking portion 46 is positioned on the same side of the sleeve plane 39 as the return portion 44. Further, the first leg is freely slideable within the first and second cylindrical walls 18 and 24.

In a second, or locked, mode of operation, the second leg 40 is pivoted downwardly wherein the bearing surface 66 passes under the longitudinal axis 38. During this operation, the first leg 30 rotates about its longitudinal axis 38. As the bearing surface 66 passes a point perpendicularly below the longitudinal axis 38, i.e. passes through the sleeve plane 39, it contacts the outer surface of the first cylindrical wall 18 and locks the twist pin 10 in place. The bearing surface 66 and return portion 44 are positioned on opposite sides of the sleeve plane 39 and the first leg 30 is secured within the first and second pairs of apertures 20,22 and 26,28. The twist pin 10 may be removed by pivoting the second leg 40 upwardly and to the opposite side of the sleeve plane 39 whereby the pin 10 returns to the position as illustrated in FIG. 6.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A twist pin for securing a sleeve having a cylindrical wall defining an outer diameter to an inner member received within said sleeve, said twist pin comprising:

a first leg terminating at a first end and disposed within a first plane, said first leg defining a longitudinal axis;

a second leg extending downwardly from said first leg and extending more than 180 degrees relative to said longitudinal axis, said second leg passing below said longitudinal axis proximate said first end at a crossover and terminating at a second end;

said second leg including a locking portion having a protuberance adapted for extending inwardly toward said sleeve, said protuberance including a bearing surface adapted for contacting said wall of said outer sleeve, said bearing surface positioned below said first plane and intermediate said crossover and said second end; and said second leg further including a return portion, said return portion having an extremity adapted to be positioned further from a center of said sleeve than said cylindrical wall of said sleeve thereby providing a clearance between said second leg and said sleeve such that said first leg is selectively rotatable along said first longitudinal axis.

2. The twist pin of claim 1 further comprising:

a passage defined between said second leg and said longitudinal axis at said crossover; and wherein a width of said passage is adapted to be at least as great as one half of said outer diameter of said sleeve.

3. The twist pin of claim 2 wherein said width of said passage is adapted to be approximately equivalent to 0.6 times said outer diameter of said sleeve.

4. The twist pin of claim 1 wherein said return portion is arcuate intermediate said first leg and said locking portion, said return portion adapted to have a radius greater than one-half of said outer diameter of said sleeve thereby defining said clearance.

5. The twist pin of claim 4 wherein said radius is approximately equivalent to 0.8 times said outer diameter of said sleeve.

6. The twist pin of claim 1 wherein said second leg further comprises a straight connecting portion disposed intermediate said first leg and said return portion, said connecting portion extending in substantial perpendicular relation to said first longitudinal axis.

7. A twist pin comprising:

a first straight leg disposed within a first plane and including opposed first and second ends, said first leg defining a longitudinal axis;

a connecting portion disposed in substantially perpendicular relation to said first leg and including opposed first and second ends, said first end of said connecting portion connected to said second end of said first leg;

an arcuate return portion extending downwardly from said connecting portion and including opposed first and second ends, said first end of said return portion connected to said second end of said connecting portion and said second end of said return portion disposed below said longitudinal axis proximate said first end of said first leg;

a locking portion including a first end connected to said second end of said return portion, said locking portion further including a protuberance positioned on an opposing side of said longitudinal axis from said arcuate portion, said protuberance extending inwardly toward said arcuate portion; and wherein said connecting portion and said return portion extend approximately 180 degrees from said second end of said first leg to a point below said first end of said first leg.

8. The twist pin of claim 7 wherein said locking portion includes:
   a first locking member;
   a second locking member angled relative to said first locking member to form a bend between said first and second locking members; and
   said bend defines said protuberance.

9. A coupling comprising:
   an outer sleeve including a first cylindrical wall having an outer diameter, a first pair of diametrically disposed and coaxially aligned apertures formed within said wall;
   an inner member received within said outer sleeve, said inner member including a second cylindrical wall and a second pair of apertures formed within said second cylindrical wall, said second pair of apertures coaxially aligned with said first pair of apertures;
   a twist pin for securing said outer sleeve to said inner member, said twist pin including
   a first leg extending through said coaxially aligned first and second pairs of apertures, said first leg terminating at a first end positioned outside of said first cylindrical wall and defining a longitudinal axis;
   a second leg extending downwardly from said first leg and extending around said first cylindrical wall for more than 180 degrees to terminate at a second end, said second leg passing below said longitudinal axis proximate said first end at a crossover;
   a clearance defined between said second leg and said first cylindrical wall wherein said first leg is selectively rotatable about said longitudinal axis;
   a passage defined between said second leg and said longitudinal axis at said crossover, said passage having a width measured in a perpendicular direction from said longitudinal axis to said second leg, said width at least as great as one-half of said outer diameter of said sleeve;
   said second leg including a locking portion having a protuberance defining a bearing surface, said bearing surface positioned below said first leg and intermediate said crossover and said second end; and
   wherein said bearing surface is selectively engagable with said first cylindrical wall upon selective rotation of said first leg about said longitudinal axis.

10. The coupling of claim 9 wherein said width of said passage is substantially equivalent to 0.6 times said outer diameter of said sleeve.

11. The coupling of claim 9 wherein said second leg includes an arcuate return portion having a radius greater than one-half of said outer diameter of said sleeve thereby defining said clearance.

12. The coupling of claim 11 wherein said radius is approximately equivalent to 0.8 times said outer diameter of said sleeve.

13. The coupling of claim 9 wherein said second leg further includes a straight connecting portion disposed intermediate said first leg and said return portion, said connecting portion extending in substantial perpendicular relation to said longitudinal axis.

14. The coupling of claim 9 further comprising:
   a spray head supported by said sleeve; and
   wherein said inner member comprises a tubular member in fluid communication with said spray head.

* * * * *

UNITED STATES PATENT AND TRADEMARK OFFICE
CERTIFICATE OF CORRECTION

PATENT NO. : 6,199,917 B1
DATED : March 13, 2001
INVENTOR(S) : James H. Clevenger It is certified that error appears in the above-identified patent and that said Letters Patent is hereby corrected as shown below:

Column 6,
Line 34, after "radius is" insert -- adapted to be --.

Signed and Sealed this

Sixth Day of November, 2001

Attest:

*Nicholas P. Godici*

*Attesting Officer*

NICHOLAS P. GODICI
*Acting Director of the United States Patent and Trademark Office*